(Model.)
T. J. LOFTUS.
BUSHING FOR BARRELS.
No. 254,667. Patented Mar. 7, 1882.
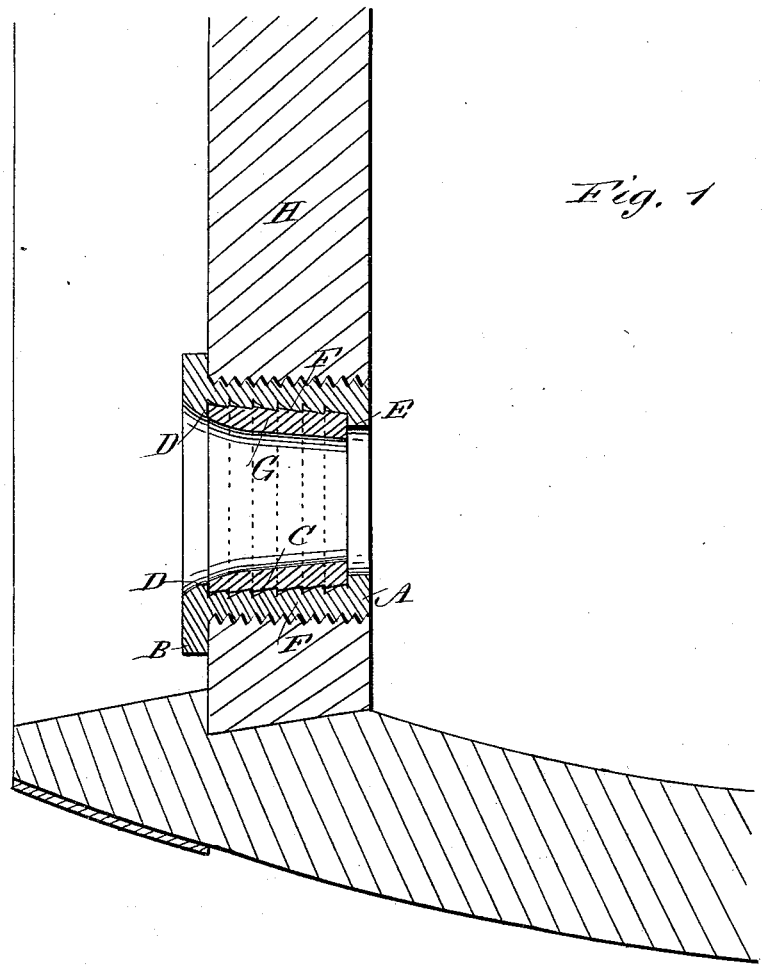
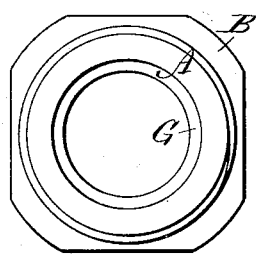
WITNESSES:
C. Neveux
C. Sedgwick
INVENTOR:
T. J. Loftus
BY Munn & Co
ATTORNEYS.

UNITED STATES PATENT OFFICE.

THOMAS J. LOFTUS, OF SACRAMENTO, CALIFORNIA.

BUSHING FOR BARRELS.

SPECIFICATION forming part of Letters Patent No. 254,667, dated March 7, 1882.

Application filed October 31, 1881. (Model.)

*To all whom it may concern:*

Be it known that I, THOMAS J. LOFTUS, of Sacramento, in the county of Sacramento and State of California, have invented a new and Improved Bushing for Barrels, of which the following is a full, clear, and exact description.

The object of my invention is to prevent the aperture in barrel-heads into which the cock or spigot is driven from being unduly enlarged.

The invention consists in a metal bushing adapted to be screwed or driven into the spigot-aperture in the barrel-head, said bushing being provided with a packing or lining of wood, rubber, &c.

Reference is to be had to the accompanying drawings, forming part of this specification, in which similar letters of reference indicate corresponding parts in both the figures.

Figure 1 is a longitudinal sectional elevation of a part of one end of a barrel provided with my improved bushing. Fig. 2 is a rear elevation of the bushing.

The bushing A, made of any suitable metal, is provided with an external screw-thread and with a flange, B, at its outer end. The bushing is further provided with an annular recess, C, in its inner surface, whereby an annular ridge, D, will be formed at the outer end of the bushing, and a like ridge, E, at the inner end. The recessed inner surface of the bushing is further provided with a series of transverse circular grooves, whereby a series of annular teeth, F, projecting toward the rear end of the bushing, will be formed on the inner surface of the bushing. The inner surface of the bushing is slightly beveled from the outer toward the inner end. A short tubular packing or lining, G, of wood, rubber, leather, or other suitable material (preferably wood) is driven into the bushing until its sides pass into the recess in the inner surface of the bushing, whereby the same will be held in the bushing, the front ridge, D, and the teeth F preventing a withdrawal of this lining or packing G. The bushing A is then screwed into the aperture in a barrel-head, H. A cork or other stopper is driven into this bushing, and if the barrel is to be tapped the spigot or faucet is driven into the bushing in the same manner as a spigot is driven into an aperture of a barrel, whereby the cork or stopper will be forced through the bushing into the barrel.

The packing G causes the spigot to fit closely in the bushing and prevents leakage. In case the packing G becomes worn off, and if the opening becomes too large for a spigot or faucet, the packing can be removed and replaced by a new packing. Thus if the opening for the spigot at any time becomes too large, this can be remedied without requiring a new head to be placed into the barrel.

Having thus described my invention, I claim as new and desire to secure by Letters Patent—

The combination, with the tubular lining G, of the bushing A, provided with the flange B at its outer end, and the annular recess C, beveled from the outer toward the inner end, and having a series of annular teeth projecting toward the rear end of the said bushing, whereby the lining will be retained in the bushing, substantially as shown and described.

THOMAS J. LOFTUS.

Witnesses:
P. J. HOPPER,
JAS. L. ENGLISH.